June 28, 1966
K. JOHNSEN
3,258,279
CONNECTOR SEAL
Filed Nov. 30, 1964
2 Sheets-Sheet 1
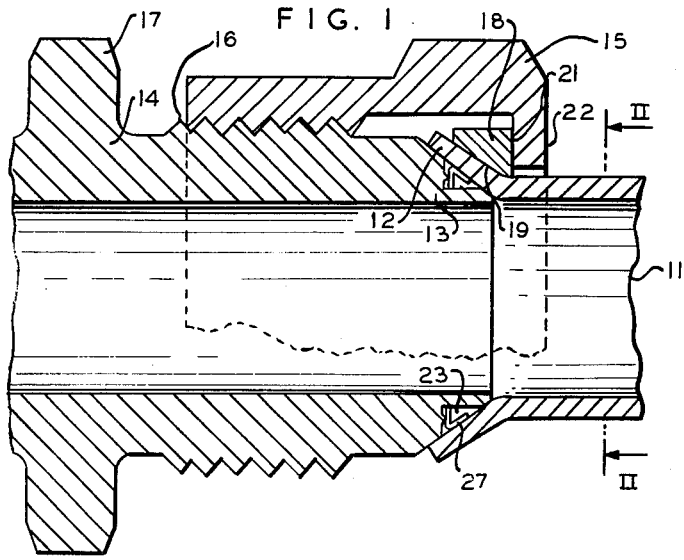
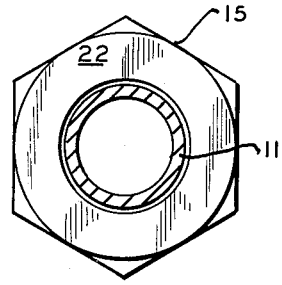
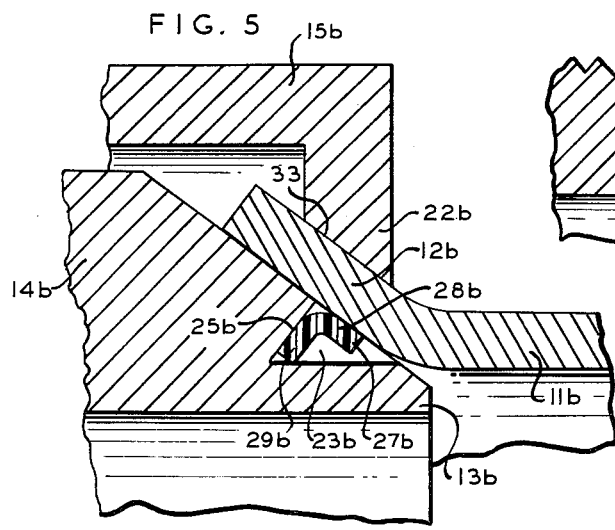
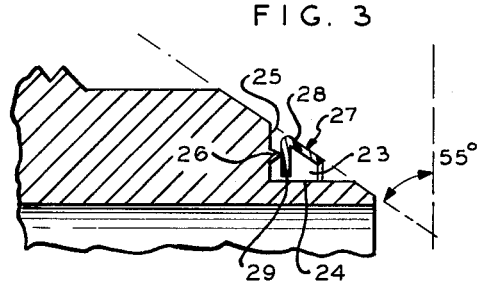
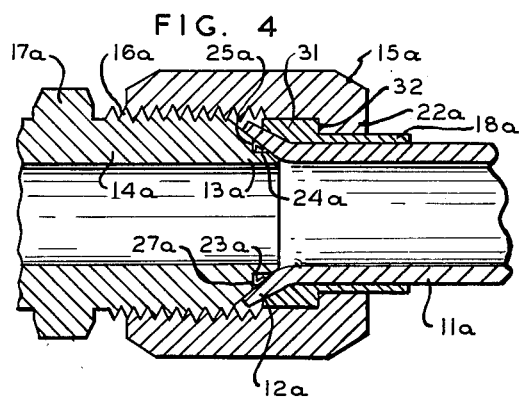
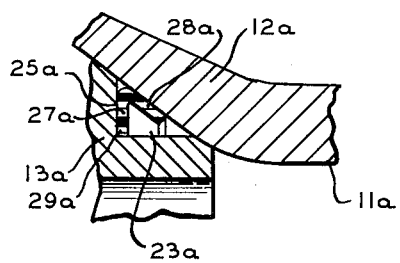
INVENTOR.
KENNETH JOHNSEN
BY  *Towson Price*
ATTORNEY

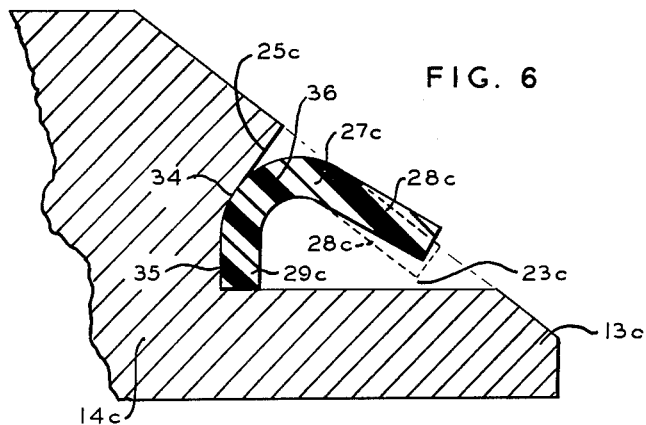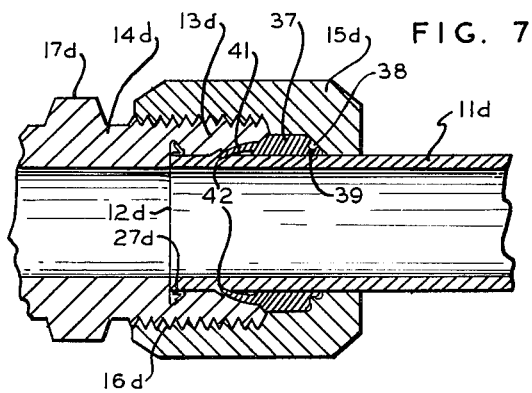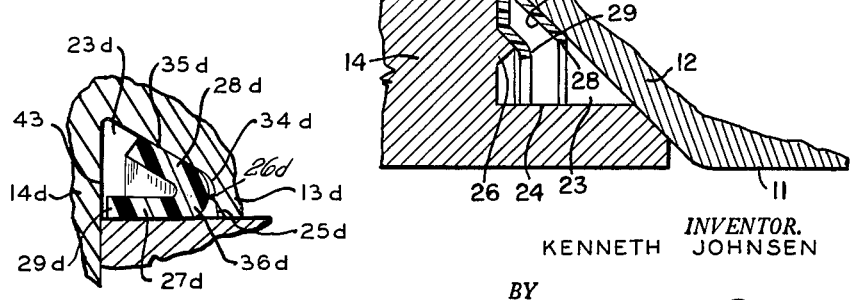

United States Patent Office 3,258,279
Patented June 28, 1966

3,258,279
CONNECTOR SEAL
Kenneth Johnsen, Whippany, N.J., assignor, by mesne assignments, to Robert R. Reddy, Pasadena, Calif.
Filed Nov. 30, 1964, Ser. No. 416,956
3 Claims. (Cl. 285—110)

This application is a continuation-in-part of my application Serial No. 128,872, filed August 2, 1961, now abandoned, and similarly titled.

This invention relates to couplings or joints for pipes and the like and, more particularly, to one employing a sealing element or gasket of plasticized material as an auxiliary leak-preventing device between the connected parts.

An object of my invention is to provide an effective seal between a pipe or tube and a connected fitting, especially such which undergo vibration while carrying fluid at varying pressures, whereby the joint will not leak, even if the holding nut is slightly loosened, because the pressure in the pipe deflects the seal and causes it to follow the interior contour at the connection.

Another object of my invention is to provide a joint which is automatically progressively tightened as the pressure of carried fluid increases, which offers almost no resistance to passage of fluid therethrough, and in which the auxiliary or flexible sealing part is cheap and easily replaced.

A further object is to provide such a joint which eliminates the necessity of other than a mere wedging element and/or clamping nut for holding it together and which may use said wedging element held by a nut against the correspondingly-tapered end of a tube, with a gasket received in a groove in a fitting connected to said tube by said nut and serving as an auxiliary sealing device.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a fragmentary axial sectional view of a pipe held tightly in engagement with a connecting fitting by a nut, with a flexible connector seal between the adjacent portions of said pipe and fitting, forming an assembly embodying my invention.

FIGURE 2 is a transverse sectional view on the line II—II of FIGURE 1, in the direction of the arrows, but to a smaller scale.

FIGURE 3 is an enlarged fragmentary sectional view, corresponding to FIGURE 1, of the seal or sealing element and associated fitting separated from the rest of the parts, in order to show more clearly the construction of the seal in its relationship to the adjacent part of the fitting when there is no fluid under pressure in the pipe.

FIGURE 3a is a view corresponding to FIGURE 3, but further enlarged and showing, in a slightly modified form, the relative positions of the parts when subjected to the action of fluid in the pipe and under sufficient pressure to deform the flexible connector seal into tight engagement wtih the adjacent surfaces.

FIGURE 4 is a fragmentary axial sectional view corresponding to FIGURE 1, but showing a modification.

FIGURE 4a is an enlarged view of a part of the assembly shown in FIGURE 4.

FIGURE 5 is a fragmentary axial sectional view corresponding to FIGURE 1, but showing another modification.

FIGURE 6 is a fragmentary axial sectional view corresponding to FIGURE 1, but showing a further modification.

FIGURE 7 is a fragmentary axial sectional view corresponding to FIGURE 1, but showing a still further modification.

FIGURE 8 is an enlarged fragmentary axial sectional view corresponding to FIGURE 7, for more clearly showing the seal in place and its construction, but illustrating only small portions of associated parts.

Difficulty has been experienced in effectively sealing coupled fittings, including pipes or tubes to be connected, undergoing vibration and temperature fluctuations, resulting from cryogenic and high temperatures, causing the fittings to contract and expand, while fluid is carried therethrough and subjected to pressures of from one to 10,000 pounds per square inch. Further difficulty has been observed in meeting the machining tolerances required to readily seal parts connected metal-to-metal without high torquing with present sealing practice. My invention is proposed to solve these problems by employing a flexible sealing element to supplement the seal provided by nominally tight metal-to-metal contact.

Referring to the drawings in detail, and first considering the embodiment of my invention illustrated in FIGURES 1, 2, 3 and 3a, there is shown a section of tubing or pipe 11, indicated as of metal by the sectioning, one end of which is flared outwardly, as indicated at 12. The diameter of the pipe may be as desired, an example being from ⅛" to 3". The flared portion 12 fits over a correspondingly-tapered end portion 13 of a fitting or coupling member 14, to which it is connected as by a nut 15 threaded to an outer portion of the fitting 14, as indicated at 16, to form a normally tight metal-to-metal engagement, normally tending to prevent any appreciable leakage between the engaged metal surfaces. The flare 12 may, if desired, be applied to the tube or pipe 11 after insertion in the ferrule 18 and/or nut 15.

The nut 15 may be hexagonal for application of wrench, as shown most clearly in FIGURE 2, or other shape as desired. A similar comment applies to the intermediate or enlarged portion 17 of said fitting 14. It will be understood that the portion to the left of the hexagonal or enlarged portion 17, broken away in FIGURE 1, may be formed similarly to that to the right, in order to serve for connection with a pipe or tube like that designated 11.

The nut 15 serves to connect the flared tubing 11 to the connector or fitting 14, as by engaging an annular ferrule 18, desirably approximately triangular in section, as illustrated. As here shown, the ferrule 18 has one face 19 inclined to correspond with the inclination of the flared portion 12 of the tubing 11 and a face 21 normal to the axis of said tubing, to be engaged by an inturned flange portion 22 on the nut 15. However, the ferrule 18 may be omitted if a nut is used like that designated 15b in FIGURE 5. Tightening of the nut 15, as by turning one way, because of the threaded connection 16, forces the ferrule 18 against the flared portion 12 of the tube 11 and in turn wedgingly urges said flared portion against the correspondingly-tapered portion 13 of the fitting 14, forming a normally generally leak-proof connection.

In order to prevent leakage which might develop between the flared portion 12 of the pipe 11 and the engaged frustoconical surface of the tapered portion 13 of the fitting 14, especially if the nut is not tightened sufficiently when initially applied or becomes loosened because of temperature changes and/or vibration, I provide an annular groove 23 in the sloping or frustoconical surface of the tapered portion 13 of said fitting. In the present embodiment, the groove 23 is desirably generally triangular in section and defined by a cylindrical wall or surface 24 and a flat annular wall or surface 25 from which protrudes an annular extension 26 desirably triangular in section and disposed intermediate the outer and inner boundaries of said surface 25.

Disposed in said groove 23 is a flexible seal or sealing element 27, desirably but not necessarily formed of plasticized material. "Kel F," "Teflon," "Mylar," rubber, "Tatilum" and "Nylon" are mentioned as examples. Flexible metal seals formed of thin aluminum or copper may also be used. The exact material, however, is dependent on the media to be transported by the tubing 11, as the seal material must be compatible with said media. In the present embodiment, the annular seal 27 is desirably formed of "Kel F" Grade 300, substantially V-shaped in cross-section, by having a pair of angularly-disposed flanges or legs 28 and 29, desirably of approximately the same width and thickness. The width of the flange or leg 28 is such that it engages the flared portion 12 along only a portion of its surface which bridges the groove 23. Thus, if fluid leaks between the portions 12 and 13, it passes into the groove through the space left by the flange 28 along the bridging surface and into the angle between the flanges 28 and 29. This fluid would then force the flanges into tighter engagement with the respectively engaged surfaces and tend to prevent leakage between the portions 12 and 13 to the atmosphere. The material and thickness of the element 27 must be such that it is deformable to the shape illustrated in FIGURE 3a, if such deformation would occur under the pressure to which it would be subjected and at the operating temperature, without cracking or other failure.

For example, when the diameter of the connected pipe 11 varies between ⅛" and 3", the width of the flanges 28 and 29 may vary between about .015" and .100" united along a curved portion of radius varying between about .010" and .060", and the thickness of the material, if non-metallic, may vary between about .005" and .030".

The leg 28 is here shown at an acute angle to the leg 29, corresponding with or slightly greater than the angle between the flared portion 12 and a plane normal to the axis of the tubing 11, here shown as about 55° so that it normally lies flat against the inner surface of said flared portion, or is bent to that position and thus prestressed upon assembly, as illustrated in FIGURE 1. The leg 29 is desirably normally flat and, when in position, an intermediate portion thereof is engaged by the outer or free edge or apex of the protrusion 26, which indents it slightly, or directly by the surface 25 if no such protrusion is employed, so as to effect a good seal against passage of fluid thereby even if the engaged surfaces are slightly out of round.

The thickness of the material of the seal 27 may be determined in accordance with the size of the pipe 11 and the pressures to be carried, an example being from .005" to .125". The elasticity of the seal 27, due to its construction, allows it to deflect as pressure and temperature changes take place in the media flowing or contained in the pipe 11 and fitting 14, or the pressure increases, or becomes effective upon the passage of said media into said pipe. The outward pressure of any media leaking between the engaged surfaces acts on the inner surfaces of the flange 28 and 29, being greater than on the outer surfaces thereof along which fluid leaks to the atmosphere, and forces the legs or flanges 28 and 29 apart. The former is pressed against the flared portion 12 of the pipe 11 which bridges and thus closes the groove 23, and the latter against the protrusion 26 of the fitting 14 if used thereon as shown in the present embodiment. Finally, upon the application of sufficient pressure, the flange 27 also engages the outer slope of the protrusion 26 and the surface 25 therebeyond, deforming to a shape such as illustrated in FIGURE 3a.

Thus the complete reaction will allow the seal 27 to follow the connection contour, such as the adjacent surfaces of the tube and fitting even if, for some reason, the connection or nut 15 becomes loosened due to vibration, temperature changes causing contraction or expansion, or is loose due to faulty installation, whether or not there is a protrusion employed, such as designated 26. It is also contemplated to preload the seal 27 against the flared tube section, as by making the angle between the legs 28 and 29 somewhat greater than that in the assembled position, so that there is prestressing, that is, said legs respectively press against the surfaces engaged thereby, even when there is no pressure in the tube 11 and fitting 14. The structure is effective in preventing leakage past the seal during storage, while under ambient, cryogenic or high temperatures. Flow characteristics result, as are inherent in seals held under pressure during storage or operation.

The embodiment illustrated in FIGURE 3a is similar to that illustrated in FIGURES 1, 2 and 3, except that the pipe 11 is shown with a portion 12 flared to an angle of 45° to the axis, rather than 35° as in FIGURES 1, 2 and 3, and the protrusion 26 has its apex formed by sides extending at an angle of 90° to one another rather than at an angle of approximately 75°, as in FIGURE 3. The reason for showing this variation in angle is to indicate that I am not limited to the 55° angle shown in FIGURE 3.

The main reason for FIGURE 3a is to show how the seal 27, which is illustrative of other seals in succeeding embodiments and designated 27 with an added letter, deforms when the fluid contained or carried in the pipe or tube, such as 11, is under sufficient pressure and leakage occurs between the flared portion 12 and the engaged surface or surfaces on the connected fitting 14. Such leaking fluid enters the triangular groove 23 between the normally engaged metal surfaces and, while tending to leak out to the atmosphere, engages the inner area of the seal 27 to force the legs apart and into still tighter engagement with the inner surface of the flared portion 12 and the surface 25 of the connector 14, as well as the outer slope of the protrusion 26, if such is employed.

In the specific example of FIGURE 3a, an extreme position where the flexible sealing element 27 is under high pressure, is illustrated. Here, the flange 28 thereof tightly engages the inner surface of the flared portion 12 and the flange 29 thereof tightly engages the surface 25 of the connector 14, the element 27 being crowded into the adjacent angle between the parts. The free end portion of the flange 29 at the same time is bent at an angle toward the connector 14, as illustrated, tightly engaging the outer slope of the protrusion 26, thereby effecting a very tight seal and preventing leakage between the parts, even if sufficient play develops that leakage occurs between the metal surfaces, supposed to be in tight engagement with one another.

Referring now to the embodiment of my invention illustrated in FIGURES 4 and 4a, there is shown a section of tubing or pipe 11a, one end of which is flared outwardly as indicated at 12a. The flared portion 12a fits over the correspondingly tapered end 13a of the fitting 14a, to which it is connected as by a nut 15a, threaded to an outer portion of the fitting 14a, as indicated at 16a.

The nut 15a may be hexagonal, as in the preceding embodiment, or other shape, cylindrical or non-cylindrical, as desired, but desirably noncylindrical so as not to need a pipe wrench. A similar comment applies to the intermediate portion 17a of said fitting 14a. It will be understood that the portion not shown, or that to the left of the hexagonal or enlarged portion 17a, may be formed similarly to that to the right, in order to serve for connection with a pipe like that designated 11a.

The nut 15a serves to connect the flared tubing 11a to the fitting 14a, as by engaging an annular ferrule 18a, suitable clearance being provided between the assembled parts, and forcing its enlarged but flared end portion 31 against the tapered portion 12a of the tube 11a. The inclination of the flared portion 31 desirably corresponds with the inclination of the exterior surface of the flared portion 12a. The ferrule 18a, in the present embodiment, has an outstanding shoulder 32 lying in a plane normal to the axis of the tubing 11a to be engaged by the adjacent surface of an inturned flange portion 22a on the nut 15a. Tightening of the nut, as by turning one way, causes the threaded connection 16a to force the ferrule 18a against the flared portion 12a of the tube and, in turn, urges said flared portion against the correspondingly-tapered portion 13a of the fitting.

In order to prevent leakage between the flared portion 12a and the tapered portion 13a, I provide an annular groove 23a in the sloping surface of the tapered portion 13a of said fitting. In the present embodiment, the groove 23a is generally triangular in section and defined by a cylindrical wall or surface 24a and a flat annular wall or surface 25a. However, in this instance, there is shown no protrusion corresponding with that designated 26 in the preceding embodiment, although if desired some one may be provide within the spirit and scope of the invention.

Disposed in said groove 23a is a seal or sealing element 27a, desirably formed of plasticized material as in the preceding embodiment. In the present embodiment, the annular seal 27a is substantially V-shaped in cross-section, as by having a pair of angularly disposed flanges or legs 28a and 29a. The leg 28a is at an angle to the leg 29a corresponding with or slightly greater than the angle between the flared portion 12a and a plane normal to the axis of the tubing 11a, so that it normally lies flat against the inner surface of said flared portion, as illustrated in FIGURE 4, or is bent to that position during assembly. Leg 29a is desirably normally flat and, when in position, if no protrusion is present, engaged by the flat face 25a defining the groove 23a, so as to effect a good seal against passage of fluid thereby.

The elasticity of the seal 27a allows it to deflect under pressure due to its construction as the pressure of the media flowing or contained in the tube 11a and fitting 14a increases or becomes effective upon the passage of said media into the tubing. The outward pressure of the media which leaks between the fitting 14a and the flared portion 12a of the tubing 11a, acts on the inner surfaces of and forces the flanges or legs 28a and 29a apart, pressing them into the respectively engaged surfaces of the connected parts, as leakage to the atmosphere between the outer surfaces of said flanges and the adjacent surfaces of the elements 12a and 13a causes the pressure therebetween to be less than that on the inner surfaces of said flanges.

Thus the complete reaction will allow the seal 27a to follow the tube and fitting, even if for some reason the connection becomes loosened due to vibration or faulty installation. As in the preceding embodiment, it is also contemplated to preload the seal 27a against the flared tube section, as by making the angle between the legs 28a and 29a somewhat greater than that in the assembled position, so that said legs respectively press against the surfaces engaged thereby, even when there is no pressure in the tube 11a and fitting 14a.

Referring now to the embodiment of my invention illustrated in FIGURE 5, there is shown a section of tubing or pipe 11b, one end of which is flared outwardly as indicated at 12b. The flared portion 12b fits over a correspondingly tapered end 13b of a fitting 14b, to which it is connected as by a nut 15b threaded to an outer portion of said fitting, as in the preceding embodiment. The nut may be hexagonal or other shape in accordance with the description of the preceding embodiments and a similar comment applies to the intermediate portion of the fitting 14b. The portion of the fitting not illustrated may be in accordance with the description of the preceding embodiments.

In the present embodiment, instead of employing a ferrule, as in the preceding embodiments, the inturned flange portion 22b of the nut 15b is illustrated as having its inner surface tapered or formed concavely frustoconcal, as indicated at 33, to correspond with the shape of the outer surface of the flared frustoconical portion 12b of the tubing 11b. The present embodiment illustrates a connection between a pipe 11b having an interior diameter different or larger than that of the fitting 14b. This makes it so that the flared portion 12b does not completely bridge the groove 23b to normally prevent entrance of fluid under pressure into said groove. This is not as good as the complete bridging of the other forms, with metal-to-metal area contact between the fitting and tubing on both sides of the groove. It can be improved, as by moving the groove outwardly and to the left so as to be entirely bridged by the flared portion 12b. However, it is preferred to have the diameters correspond, at least approximately.

In order to prevent leakage between the flared portion 12b of the tubing and the tapered portion 13b of the fitting 14b, I provide an annular groove 23b in the sloping surface of the tapered portion of said fitting. Said groove is generally triangular in section and corresponds generally with that of the embodiment of FIGURE 4, except that instead of its wall or surface 25b being normal to the axis of the tube 11b, it s frustoconcal so that elements thereof extend generally perpendicular to the inner frustoconical surface of the flared portion 12b which engages the tapered portion 13b of the fitting 14b.

By virtue of the construction of the groove 23b other than as a right-angled triangle in section, with the right angle between the surfaces on the tapered portion of the fitting 14b, as distinguished the preceding embodiments, the seal or sealing element 27b, which corresponds with the element 27 of the first embodiment, has its legs or flanges 28b and 29b disposed at a greater angle, that is, approximately at a right angle to one another, or even slightly greater for preloading purposes as previously explained. Except as specifically described in connection with the present embodiment, the same way correspond with that of the first embodiment. The action of the seal 27b is similar to that of the seal 27a of the second embodiment, inasmuch as there is provided no protrusion corresponding with that designated 26 in the first embodiment. However, I may provide such a protrusion, if desired, corresponding with that designated 26, on the frustoconical surface 25b, where it would have a similar function.

Referring now to the embodiment of my invention illustrated in FIGURE 6, there is shown a portion of a fitting 14c, corresponding generally with the fitting 14b of the preceding embodiment and so having a correspoindingly tapered end 13c adapted to be received in an outwardly flared portion of a section of tubing or pipe, not shown, but corresponding with that designated 12, 12a or 12b in one of the preceding embodiments. A nut, as in one of the preceding embodiments, with or without a ferrule, may serve for connecting the flared portion of the tubing to the fitting 14c.

In order to prevent leakage between the flared portion of the tubing referred to and the tapered portion 13c of the fitting 14c, I provide an annular groove 23c in the sloping or frustoconical surface of said tapered portion 13c. Said groove 23c corresponds generally with that of the embodiment of FIGURE 5, except that its wall or surface 25c, after starting at its outer edge, or from the sloping surface of the portion 13c, is a direction normal to said sloping surface, curves, as indicated at 34, and terminates at the cylindrical wall or surface 24c, after extending in a plane normal to the axis of the fitting 14c, as indicated at 35.

By virtue of the construction of the groove 23c, in which one of the defining walls or surfaces has angularly disposed portions 25c and 35, the seal or sealing element 27c used therewith, while corresponding generally with the element 27 of the first embodiment, has its legs or flanges 28c and 29c connected by a curved portion 36, rather than having a fairly sharp angle therebetween. Although the flange 28c is here shown wider than the flange 29c, but of the same thickness, said flanges may be of substantially the same width. Also, the angle between the parts 28c and 29c is acute rather than being generally right angular as in the embodiment of FIGURE 5.

In the present embodiment, the preloading referred to is illustrated by showing the leg or flange 28c of the seal in full lines in a free condition, that is, extending beyond the plane of the beveled or tapered portion 13c, and in dotted-line position representing that taken by it when assembled with the tubing, not shown, but used as in the preceding embodiments. Except as specfically described in connection with the present embodiment, the same may correspond with that of the first embodiment, except that there is shown no protrusion corresponding with that designated 26. It will be understood, however, that such a protrusion may be employed on one of the angularly disposed portions, or on the curved surface uniting said portions, if desired.

Referring now to the embodiment of my invention illustrated in FIGURES 7 and 8, there is shown a section of tubing or pipe 11d which, in this instance is cylindrical, that is, it does not have its free or lefthand end flared, as in the preceding embodiments. Instead, the unflared or straight end portion 12d is disposed inside of the adjacent end portion 13d of a fitting 14d to which it is connected, as by a nut 15d threaded to an outer portion of the fitting 14d, as indicated at 16d.

The nut 15d may be hexagonal for application of a wrench, as shown in connection with preceding embodiments, or some other shape as desired. A similar comment applies to the intermediate or enlarged portion 17d of the fitting 14d, it being understood that the portion to the left of said portion 17d, broken away in FIGURE 7, may correspond with that to the right, as in preceding embodiments.

Inasmuch as the connected end of the pipe 11d is not flared, means must be provided for holding it in place in the fitting. In the present embodiment, the means takes the form of a bushing device 37, fitted within the nut 15d and connected thereto by suitable means. The connecting means here takes the form of a projection 38 on the nut 15d received in a corresponding pocket 39 in the bushing device 37 in order to hold said device in place, as illustrated in FIGURE 7.

The free end portion of said device 37 is, in the present embodiment, extended as a relatively thin flexible projection 41 having a sharp edge 42 at its extreme left end directed inwardly and to the left, so that it can function as a biting element. This projection, or something which actually forms, or engages behind, a shoulder on the outside of the pipe or tube 11d, may have an initial diameter slightly smaller than the outside diameter of the tube 11d so that connection between said bushed nut 15d may be made by forcing said tube 11d to the left to the position illustrated in FIGURE 7. In so doing, the sharp edge 42 passes beyond the end of the tube 11d, because it is directed to the left, but said edge is then locked in place upon pulling to the right on the tube 11d, by the edge 42 biting or cutting into said tube, so that its sharp edge 42 then actually lies or contracts below the extreme outer surface thereof, as illustrated, and preventing it from being withdrawn to the right with respect to said nut 15d.

In order to prevent leakage between the end portion 12d of the tube 11d and the right-hand end portion 13d of the fitting 14d, I provide an annular groove 23d in the inner cylindrical surface of said portion 13d of said fitting. In the present embodiment, the groove 23d is generally like the groove 23c of the embodiment of FIGURE 6, except that it opens inwardly rather than outwardly. Said groove 23d has an annular wall or surface 25d which, after starting at its inner edge or from the inner cylindrical surface of the portion 13d in a direction normal to said surface, curves as indicated at 34d, and terminates at the flat annular wall or surface 43, after extending diagonally or along a concave frustoconical surface indicated at 35d and shown lying at an angle of about 30° to the axis of the fitting.

By virtue of the construction of the groove 23d in which one of the defining walls or surfaces has angularly disposed portions 25d and 35d, the seal or sealing element 27d used therewith corresponds generally with the element 27c of the embodiment of FIGURE 6. That is, said seal 27d has its legs or flanges 28d and 29d, which here are shown as lying at an angle of about 30° to one another, connected by a curved portion 36d, rather than having a fairly sharp angle therebetween. Also, the angle between the parts 28d and 29d is thus acute rather than being generally right-angular, as in the embodiment of FIGURE 5.

Except as specifically described in connection with the present embodiment, the same may correspond generally with that of the first embodiment. However, there is shown no protrusion corresponding with that designated 26 in the first embodiment, and there is no flaring of the connected tube 11d like that designated 12, said flaring being in effect applied to the tube by the bushing device 37, forming a part thereof. The sealing element 27d is here exterior rather than at the interior of a flared portion of the tube or pipe 11d. It will also be understood that a protrusion, like that designated 26, may be formed on the frustoconical surface 35d intermediate its ends, as it is formed on the flat annular surface 25 in the first embodiment, or on the flat annular surface 25d as indicated at 26d, and act in a similar manner.

From the foregoing disclosure it will be seen that I have devised various means providing an effective seal, supplementing that provided by nominally tight metal-to-metal contact. I here utilize the forces resulting from the pressure of the contained or carried fluid as the agent for effecting a reliable seal, between a fitting and a tube or pipe connected thereto and also connectable thereby to another tube or pipe at the other end of the fitting in a similar manner. The invention is not limited to the types of fittings illustrated, but may be utilized in other piping systems with a limited amount of reworking on existing units and designing into future applications.

It should be understood that plain metal-to-metal seal joints require a great amount of torque to seal completely. The moment the pressing force resulting from such torque becomes relaxed, due to temperature coefficient contraction and expansion, or the connecting nut becomes loose due to vibration, leakage becomes evident. This is not the case with the seal of the present case, as it automatically takes up and relaxes, in accordance with the demands of the contained media and the temperature changes.

Advantages of my invention which may be enumerated include the fact that storable propellant systems do not affect the seal, and no problem is offered by flow of materials at low temperatures or for storage purposes. Another advantage of my invention is that thermal growth or contraction do not affect the seal. In accordance with my invention, costly fabrication of fittings is eliminated, salvage of machined units is possible, and replacement of the seal is inconsequential from a cost standpoint. The parts are readily interchangeable and readily reworkable. The working to adapt a conventional fitting to embody my invention is mainly the machining of the groove and the insertion of the flexible annular sealing member, V-shaped in section.

Testing of fittings embodying my invention show that they are adapted for universal usage and application. Pressures up to as high as 5,000 pounds per square inch have ben maintained on tests for periods of five minutes with no evidence of leakage. During such tests they have been subjected to temperatures from the ambient to as high as 200° F. and maintained at the latter temperature for a period of six hours with no evidence of leakage. They have been subjected to temperatures from ambient to a minimum of −300° F. and maintained at that minimum for a period of one hour with no evidence of leakage.

Specimens embodying my invention have been vibrated for four hours along each of their mutually perpendicular axes at an applied double amplitude of 0.018 inch and a frequency of 150 cycles per second. During such tests, pressures up to 3,000 pounds per square inch were maintained without evidence of leakage during the entire time. At room temperature, the seal specimens were tightened to the minimum wrench torque and subjected to pressure impulses of 0 to 3,000 pounds per square inch and back to 0 pounds per square inch without evidence of leakage. A seal specimen has been subjected to 100,000 cycles of impulse at a rate of 355 cycles per minute without evidence of leakage.

From the foregoing disclosure, it will be seen that I have invented an improved seal usable between fittings or coupling elements which serve to connect pipes or tubes, which connected elements may be of varying size in accordance with the service for which intended. By virtue of the construction disclosed, the greater the pressure in the connected pipes, the greater the distortion of the flexible seal to cause it to follow or lie along the adjacent contour of the connected elements. Such seal thereby prevents any otherwise possible leakage which might occur between the connected parts along a metal-to-metal seal. Here such metal-to-metal seal is supposed to be tight, but may be unintentionally left loose or become loosened in service due to vibration or temperature changes.

Thus, my invention involves a pressure-actuated seal, with an ability to deflect and follow a contour being the prime source of its capability to seal. The greater the pressure, the greater the effectiveness of the flexible seal. Tests have shown that a satisfactory seal can be obtained even without the use of a protuberance such as designated 26, and which if used may vary in size like the member 27 and in angularity as before described and illustrated.

It is not to be confused with seals in which the sole means of preventing leakage is a flexible element, such as disclosed by the Italian patient to Mazza, No. 535,137, dated November 3, 1955. Nor should it be confused with the disclosures in patents such as that to De Lano, No. 2,362,686, dated, November 14, 1944, in which a flexible element prevents tight metal-to-metal engagement. In such a structure, because of incompressibility of such a flexible element, there could not be, nor is there intended to be, any tight metal-to-metal engagement, the flexible element in itself being relied on to prevent leakage rather than a metal-to-metal contact.

Having now described my invention in detail in accordance with the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A fitting comprising inner and outer directly engaged metal elements connected by a nut element threaded to one of said directly engaged elements and with a portion designed to act on a part of the other element to wedgingly urge said elements together upon assembly thereof and tightening of said nut in order to hold fluid under pressure, the threaded of said nut-connected elements having an annular groove approximately triangular in cross-section, defined by surfaces one of which is convex cylinderical and another flat annular, and bridged by a portion of said other nut-connected element and in metal-to-metal area contact therewith, whereby leakage of said fluid along the engaged surfaces is normally prevented, an annular protrusion on said flat annular surface, a flexible annular auxiliary sealing element disposed in said groove and having a pair of angularly-disposed flanges, an intermediate portion of one of which engages the protrusion and the other of which engages the adjacent surface of the other element which bridges said groove along only a portion of the bridging surface, whereby if there occurs leakage between said metal elements of said fluid when under pressure, said fluid passes into said groove through the space left by the flange along the bridging surface and into the angle between said flanges, so that said flanges are deformed by the leaking fluid and forced into tighter engagement with said respectively engaged surfaces, to check such leakage and improve the sealing action of said fitting.

2. A fitting as recited in claim 1, wherein the protrusion is approximately triangular in cross-section and an intermediate portion of one flange of the flexible sealing element engages the apex of said protrusion and the other flange of which engages the bridging surface of the other element whereby, upon leakage of fluid under pressure between the elements, said flanges are deformed into a corner formed by engagement between the inner and outer metal elements and into tighter engagement with said respectively engaged elements to improve the seal therebetween.

3. A fitting comprising inner and outer directly engaged metal elements connected by a nut element threaded to one of said directly engaged elements and with a portion designed to act on a part of the other element to wedgingly urge said elements together upon assembly thereof and tightening of said nut in order to hold fluid under pressure, one of the nut-connected elements being a pipe with the connected end thereof disposed within a part of the other nut-connected element, a part of one of said elements connected by said nut having a sharp contracting edge surrounding said pipe so that, upon tightening said nut, said sharp edge cuts into the outer surface of said pipe and holds it in place with respect to said other nut-connected element, the threaded of said nut-connected elements having an annular groove defined by surfaces one of which is concave conical and another flat annular and bridged by a portion of said pipe in metal-to-metal area contact therewith, whereby leakage of said fluid along the engaged surfaces is normally prevented, an annular protrusion on said flat annular surface, a flexible annular auxiliary sealing element having a pair of angularly-disposed flanges disposed in said groove an which engages the protrusion, one of said flanges engaging said concave conical surface and the other of said flanges engaging the adjacent surface of the pipe, which bridges said groove, along only a portion of the bridging surface, whereby if there occurs leakage between said metal elements of said fluid when under pressure, said fluid passes into said groove through the space left by the flange along the bridging surface and into the angle between said flanges, so that said flanges are deformed by the leaking fluid and forced into tighter engagement with the respectively engaged surfaces of the metal elements, to check such leakage and improve the sealing action of said fitting.

References Cited by the Examiner

UNITED STATES PATENTS

| | | | |
|---|---|---|---|
| 2,381,829 | 8/1945 | Livers | 285—332.3 |
| 2,489,928 | 11/1949 | Phillips | 285—334.5 X |
| 2,523,995 | 9/1950 | Parmesan | 285—332.3 X |
| 2,625,955 | 1/1953 | Day | 285—382.7 X |
| 2,775,471 | 12/1956 | Douglass | 285—332.3 |

FOREIGN PATENTS

| | | |
|---|---|---|
| 451,450 | 10/1927 | Germany. |
| 204,900 | 10/1923 | Great Britain. |
| 417,637 | 10/1934 | Great Britain. |
| 680,429 | 10/1952 | Great Britain. |

CARL W. TOMLIN, *Primary Examiner.*

D. W. AROLA, *Assistant Examiner.*